United States Patent [19]
Walsh et al.

[11] Patent Number: 5,908,982
[45] Date of Patent: Jun. 1, 1999

[54] TEST APPARATUS FOR ROTARY DRIVE

[75] Inventors: James B. Walsh, Newport; Michael W. Williams, Middletown, both of R.I.

[73] Assignee: The United States of America as represented by the Secretary of the Navy, Washington, D.C.

[21] Appl. No.: 09/045,963

[22] Filed: Mar. 18, 1998

[51] Int. Cl.⁶ ..................................................... G01L 3/16
[52] U.S. Cl. ........................................................ 73/117.1
[58] Field of Search .......................... 73/116, 117, 117.1, 73/168, 865.6

[56] References Cited

U.S. PATENT DOCUMENTS

| | | | |
|---|---|---|---|
| 4,368,638 | 1/1983 | Groves et al. | 73/168 |
| 4,593,555 | 6/1986 | Krutz et al. | 73/502 |
| 4,758,967 | 7/1988 | Shmuter et al. | 73/117 |
| 5,103,671 | 4/1992 | Dyvig | 73/168 |
| 5,445,013 | 8/1995 | Clayton, Jr. et al. | 73/117 |

*Primary Examiner*—Robert Raevis
*Attorney, Agent, or Firm*—Michael J. McGowan; Prithvi C. Lall; James M. Kasischke

[57] ABSTRACT

A test apparatus for testing the performance of a rotary drive includes a shaft which extends along a longitudinal axis, at least one support for supporting the shaft in an elevated position, and a flywheel of predetermined weight rotatably attached to the shaft so that upon rotation of the shaft the flywheel rotates as well. A rotary drive powers the rotation of the shaft and flywheel, the rotary drive having a hydraulic motor which is in fluid communication with a reservoir containing hydraulic fluid by way of a servo valve. A microprocessor controls the rotation of the shaft by the rotary drive. The test apparatus further includes a rotary encoder, a torque sensor, and pressure sensors for monitoring the angular displacement of the system, the torque on the shaft, and various system pressures respectively.

11 Claims, 1 Drawing Sheet

TEST APPARATUS FOR ROTARY DRIVE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates generally to equipment used for testing, and more particularly to a test apparatus for testing the performance of a rotary drive, specifically a hydraulic motor.

(2) Description of the Prior Art

Prior classes of submarines, in order to handle weapons, have resorted to manually controlled hydraulics and manual labor. With the advent of a new class of United States submarine, this traditional manner of handling weapons has been replaced by computer controlled hydraulic system which is more complex than the prior manners of handling such weapons. Consequently, it is necessary to obtain a better understanding of fine positioning of weapons in a torpedo room containing such weapons.

During the construction of this new class of submarine, there was very limited testing at the system level of the hydraulic components, computers, and controlling software used in the weapons handling system. This limited testing was primarily due to budget and time constraints, along with the lack of a shore-based computer controlled hydraulic submarine weapon handling simulator facility. The present invention is provided for overcoming these above-noted constraints.

SUMMARY OF THE INVENTION

Accordingly, a first object of this invention is to provide a testing environment for mechanical equipment.

An additional object is to provide a testing environment for a computer controlled hydraulic system.

Another object of this invention is to provide a testing system that accounts for and allows for adjustment of loads in the system.

Yet another object of the present invention is to provide a testing apparatus which can be utilized as a low cost laboratory shore based testing facility designed to simulate a submarine torpedo room's weapon athwartship drive mechanism.

Still another object is that of such an apparatus capable of mimicking the inertia of a weapon to be moved athwartship.

A further object of the present invention is that of an apparatus capable of monitoring various system parameters and through transfer functions, simulating submarine athwartship drive performance.

In view of these objects, the instant invention provides a test apparatus for testing the performance of a rotary drive. The test apparatus comprises a shaft extending along a longitudinal axis, at least one support for supporting the shaft in an elevated position, and a flywheel of predetermined weight rotatably attached to the shaft so that, upon rotation of the shaft, the flywheel rotates as well. A rotary drive powers the rotation of the shaft and flywheel, and a control means controls the rotation of the rotary drive. The instant invention further includes a monitoring means for monitoring the angular displacement, velocity and acceleration of the flywheel. In a second aspect of the present invention, a test apparatus comprises a shaft extending along a longitudinal axis and weight means associated with the shaft. The weight means is adapted to rotate upon rotation of the shaft. A rotary drive powers the rotation of the shaft, the rotary drive having a hydraulic motor and a hydraulic reservoir containing hydraulic fluid in fluid communication with the hydraulic motor. A microprocessor controls the rotation of the rotary drive, and a monitoring means monitors the angular displacement, torque on the shaft, velocity and acceleration of the shaft, as well as pressure in various hydraulic lines.

BRIEF DESCRIPTION OF THE DRAWING

A more complete understanding of the invention and many of the attendant advantages thereto will be readily appreciated as the same become better understood by reference to the following detailed description when considered in conjunction with the accompanying drawing which illustrates a schematic elevational view of a test apparatus for a rotary drive of the present invention.

The FIGURE provides a side view of the current invention.

DETAILED DESCRIPTION OF THE PREFERRED EMBODIMENT

Figure 1:
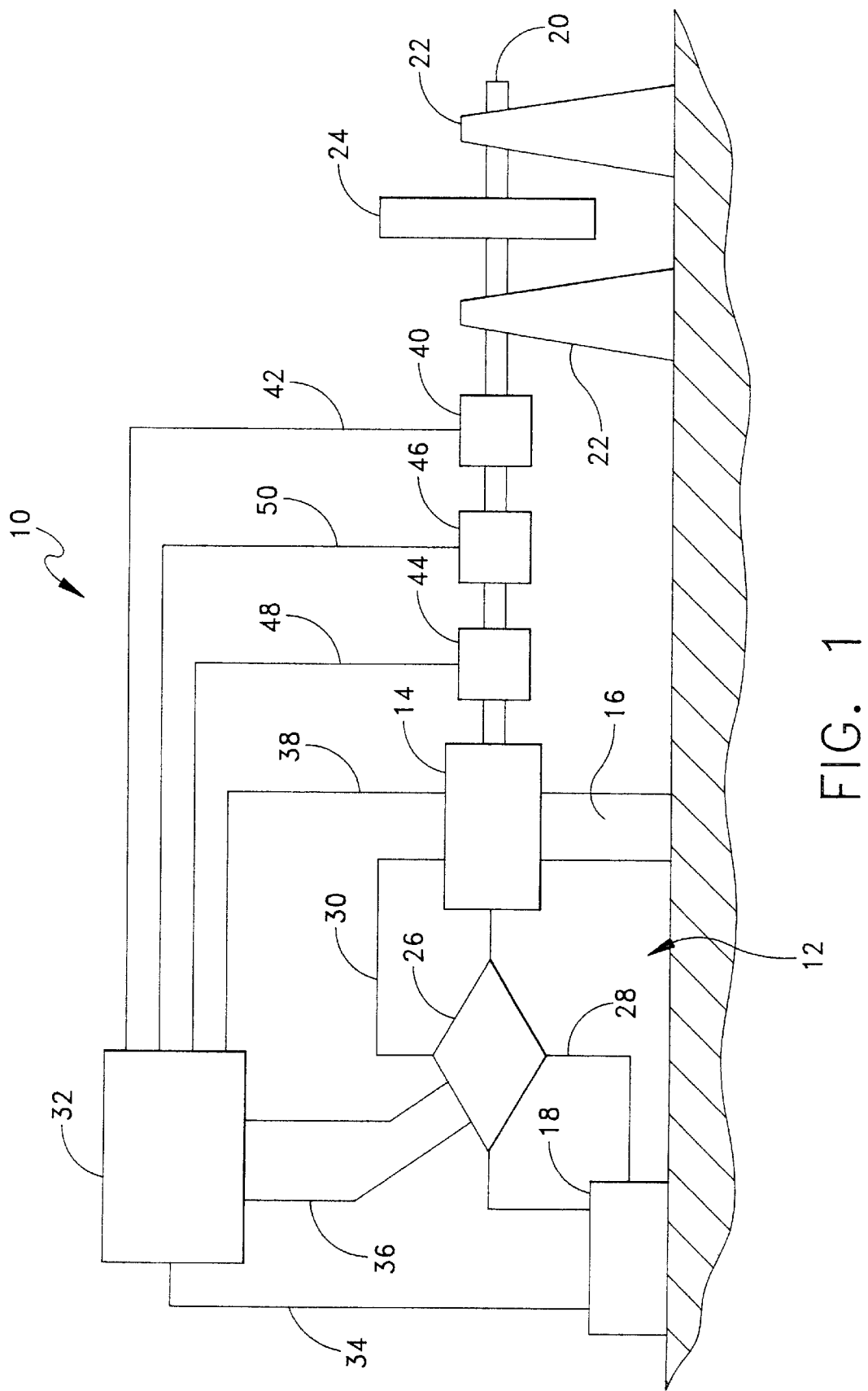

Referring now to the drawing figure, there is generally indicated at 10 a test apparatus of the present invention for testing the performance of a rotary drive, generally indicated at 12. The test apparatus 10 is intended to provide a low cost laboratory testing facility which is shore based and designed to emulate a submarine torpedo room's weapon athwartship drive mechanism. In this regard, the present invention is capable of testing any type of rotary drive, and not just the hydraulic, computer operated rotary drive 12 disclosed herein.

The rotary drive 12 includes a hydraulic motor 14 which is mounted on a support 16 and a hydraulic plant or reservoir 18 which contains hydraulic fluid and is in fluid communication with the hydraulic motor 14. As illustrated in the drawing figure, the hydraulic motor 14 powers the rotation of a shaft 20 which extends along a longitudinal axis. A pair of trusses, each indicated at 22, maintain the shaft 20 in an elevated position. Bearings (not shown) are encased within the trusses 22 for effecting the rotation of the shaft 20 with respect to the trusses. The shaft 20 supports a large flywheel 24 which is designed to mimic the inertia of a weapon to be moved athwartship. The particular construction of the flywheel 24 will be discussed in greater detail as the description of the test apparatus 10 proceeds.

The rotary drive 12 further includes a servo valve 26 which controls the delivery of hydraulic fluid to the hydraulic motor 14. More specifically, a supply line 28 delivers hydraulic fluid from the reservoir 18 to the hydraulic motor 14 and a return line 30 exhausts hydraulic fluid from the motor 14 back to the reservoir 18. Both the supply line 28 and the return line 30 pass through the servo valve 26, whereby the servo valve 26 controls the delivery of hydraulic fluid through these lines.

The rotary drive 12 is controlled by a microprocessor 32 which is in electrical communication with the servo valve 26 for controlling the delivery of hydraulic fluid to the hydraulic motor 14. The microprocessor 32 contains the necessary software to control a signal sent to the servo valve 26 to port the correct amount of hydraulic fluid to the hydraulic motor 14. The microprocessor 32 can be chosen from any of the well known computers which are designed to control and monitor motors. Pressure sensors housed in hydraulic plant 18, serve valve 26 and hydraulic motor 14 are used to relate the pressure of the reservoir 18, lines 28, 30 and hydraulic motor 14 back to the microprocessor 32. As illustrated in the drawing figure, lines 34, 36 and 38 electrically connect the reservoir 18 pressure sensor, servo valve 26 pressure sensor and hydraulic motor 14 pressure sensor to the microprocessor 32.

Further provided is a brake 40 which can be utilized to simulate added friction experienced by the drive mechanism while functioning. The brake 40 can also be used for stopping the rotation of the shaft 20. The brake 40 electrically communicates with the microprocessor 32 by line 42.

The flywheel 24 is sized to represent the inertia an athwartship drive would experience when a weapon is moved athwartship in a submarine's torpedo room. To move a single weapon, the inertia required to be overcome has been calculated to be 1920 lbs. mass. The velocity of the motion is 4.4 inches per second. The following is used to calculate an equivalent disc shape for the flywheel 24:

$$K.E._{weap}=\tfrac{1}{2}MV^2=\tfrac{1}{2}(1920)(4.4)^2 \qquad (1)$$

$$K.E._{weap}=18,858.6 \ in^2 \ lbm/sec^2 \qquad (2)$$

$$K.E._{flywh}=\tfrac{1}{2}I_{disc}\,\omega^2 \qquad (3)$$

where $$I_{disc}=\tfrac{1}{2}mr^2 \qquad (4)$$

where $$\omega=1 \ rpm.=0.1047 \ rad/sec \qquad (5)$$

The kinetic energy of the weapon is equal to the kinetic energy of the flywheel. Thus, $$18,858.6 \ in^2 \ lbm/sec^2=\tfrac{1}{2}I_{disc}\,\omega^2 \qquad (6)$$

$$I_{disc}=3,390,886.2 \ lbm. \ in^2 \qquad (7)$$

In order to determine the dimension and mass of the flywheel 24, its diameter is chosen to be sixty inches. Thus, the corresponding mass of the flywheel 24 is calculated as:

$$I_{disc}=\tfrac{1}{2}mr^2 \qquad (8)$$

$$3,390,886.2=\tfrac{1}{2}m\,(30)^2 \qquad (9)$$

$$m=7,535.3 \ lbm \qquad (10)$$

To determine the size of the flywheel 24 if the diameter is sixty inches, and the material is concrete with a density of 144 lbm/ft$^2$, the thickness is equal to 2 feet, 8 inches.

Of course, the size and shape of the flywheel 24 can be suited to the particular testing required. In this case, a flywheel having a diameter and width set forth above most closely simulates the inertia experienced by the athwartship drive when a weapon is moved. However, it should be clearly understood that the provision of a flywheel is but one method of achieving this type of simulation and that other methods can be used as well.

For monitoring the performance of the shaft 20 and flywheel 24 combination, a rotary encoder 44 and a torque sensor 46 are disposed on or adjacent the shaft 20. The rotary encoder 44 senses the displacement of the shaft 20 as it is driven by the hydraulic motor 14, whereas the torque sensor 46 detects the torque experienced by the shaft 20 and flywheel 24 combination. The data obtained by the rotary encoder 44 and the torque sensor 46 is delivered to the microprocessor 32 by lines 48, 50, respectively. The operator of the test apparatus 10 receives this information to determine the performance of the particular system being tested. The software can be manipulated and changed for varying system characteristics, such as weapon weight, for quickly and easily determining its affect on the system.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A test apparatus for testing the performance of a rotary drive comprising:
   a shaft having a longitudinal axis;
   at least one support for supporting the shaft in an elevated position;
   a flywheel of predetermined weight rotatably attached to the shaft so that upon rotation of the shaft the flywheel rotates as well;
   a hydraulic motor joined to said shaft;
   a hydraulic reservoir containing hydraulic fluid;
   a servo valve positioned between and in fluid communication with the hydraulic motor and the hydraulic reservoir;
   a control means joined to control the servo valve; and
   a monitoring means monitoring the angular displacement of the hydraulic motor.

2. The test apparatus as set forth in claim 1 said control means comprising a microprocessor in electrical communication with said servo valve and monitoring means.

3. The test apparatus as set forth in claim 2 said monitoring means comprising a rotary encoder and a torque sensor, both of which are in electrical communication with the microprocessor.

4. The test apparatus as set forth in claim 3 further comprising a brake engageable with the shaft for causing added friction to the shaft.

5. The test apparatus as set forth in claim 1, wherein:
   said control means comprises a hydraulic fluid pressure sensor sensing the pressure of hydraulic fluid contained in the hydraulic reservoir, a servo valve pressure sensor for sensing the pressure of hydraulic fluid in the servo valve, and a hydraulic motor pressure sensor for sensing the pressure of the hydraulic fluid in the hydraulic motor.

6. A test apparatus for testing the performance of a rotary drive, said test apparatus comprising:
   a shaft;
   inertia means associated with the shaft, said inertia means being adapted to rotate upon rotation of the shaft;
   a rotary drive joined to rotate the shaft, said rotary drive having a hydraulic motor and a hydraulic reservoir containing hydraulic fluid in fluid communication with the hydraulic motor;
   a brake engageable with the shaft for causing added friction to the shaft
   a microprocessor joined to control the rotation of the rotary drive; and
   monitoring means joined to said microprocessor for monitoring the angular displacement of the shaft.

7. The test apparatus as set forth in claim 6 said microprocessor being in electrical communication with said rotary drive and monitoring means.

8. The test apparatus as set forth in claim 6 said monitoring means comprising a rotary encoder in electrical communication with the microprocessor and a torque sensor in electrical communication with the microprocessor.

9. The test apparatus as set forth in claim 6 wherein said brake is controlled by said microprocessor.

10. The test apparatus as set forth in claim 6 further comprising a servo valve positioned in fluid communication between the hydraulic motor and the hydraulic reservoir.

11. The test apparatus as set forth in claim 10 wherein:
said servo valve is in electrical communication with said control means; and
said control means comprises a hydraulic fluid pressure sensor sensing the pressure of hydraulic fluid contained in the hydraulic reservoir, a servo valve pressure sensor for sensing the pressure of hydraulic fluid in the servo valve, and a hydraulic motor pressure sensor for sensing the pressure of the hydraulic fluid in the hydraulic motor.

* * * * *